(12) United States Patent
Müller et al.

(10) Patent No.: US 8,620,556 B2
(45) Date of Patent: Dec. 31, 2013

(54) CORRECTION METHOD FOR THE CORRECTION OF CHARACTERISTIC CURVES FOR ANALOGIZED HYDRAULIC VALVES IN MOTOR VEHICLE BRAKING SYSTEMS

(75) Inventors: Jochen Müller, Marburg (DE); Jochen Zimmermann, Oberwallmenach (DE); Robert Schmidt, Kelkheim (DE); Dieter Burkhard, Bingen-Büdesheim (DE)

(73) Assignee: Continental Teves AG & Co. oHG (DE)

( * ) Notice: Subject to any disclaimer, the term of this patent is extended or adjusted under 35 U.S.C. 154(b) by 1022 days.

(21) Appl. No.: 12/597,532

(22) PCT Filed: Apr. 22, 2008

(86) PCT No.: PCT/EP2008/054852
§ 371 (c)(1),
(2), (4) Date: Oct. 26, 2009

(87) PCT Pub. No.: WO2008/132095
PCT Pub. Date: Nov. 6, 2008

(65) Prior Publication Data
US 2010/0121548 A1    May 13, 2010

(30) Foreign Application Priority Data
Apr. 27, 2007   (DE) .......................... 10 2007 019 929

(51) Int. Cl.
*B60T 7/12*     (2006.01)
*G05D 1/00*     (2006.01)
*G06F 7/00*     (2006.01)
*B60T 7/00*     (2006.01)

(52) U.S. Cl.
USPC .......... 701/78; 188/151 R; 188/155; 188/156; 303/155; 303/3; 702/98; 702/100; 702/105; 701/71

(58) Field of Classification Search
USPC ............................ 701/71, 1; 702/105; 303/69
See application file for complete search history.

(56) References Cited

U.S. PATENT DOCUMENTS 5,732,378 A * 3/1998 Eckert et al. .................... 701/83
6,003,961 A * 12/1999 Binder et al. .................. 303/191

(Continued)

FOREIGN PATENT DOCUMENTS

DE      197 07 960 A1   9/1998
DE  10 2005 049 300 A1  4/2007

(Continued)

OTHER PUBLICATIONS

Strunk Jr.. W, White. E.B. The Elements of Style. 3rd ed. New York, Macmillan Publishing Co.., Inc., 1979. pp. 40 PE1408.S772.*

*Primary Examiner* — Thomas Black
*Assistant Examiner* — Paul Castro
(74) *Attorney, Agent, or Firm* — RatnerPrestia

(57) ABSTRACT

A correction method in which characteristic curves and/or correction values are produced, by way of which the drive current for one or more electrically activated hydraulic values operated in an analog fashion is measured during a pressure regulation in such a way that, during the operation of an anti-lock regulation, one or a respective characteristic curve is first prescribed and then the prescribed characteristic curve is corrected, particularly in a learning process, wherein, after a pressure build-up phase, the current pressure model value (Pmod) is compared to and/or analyzed using a model locking pressure level (Pmax).

11 Claims, 2 Drawing Sheets

(56) References Cited

U.S. PATENT DOCUMENTS

| | | | |
|---|---|---|---|
| 6,030,055 A * | 2/2000 | Schubert | 303/113.4 |
| 6,033,035 A * | 3/2000 | Neumann et al. | 303/113.4 |
| 6,238,020 B1 * | 5/2001 | Gronau et al. | 303/158 |
| 6,318,817 B1 * | 11/2001 | Martin et al. | 303/116.1 |
| 6,422,662 B1 * | 7/2002 | Haas | 303/155 |
| 6,592,192 B1 * | 7/2003 | Kaneda et al. | 303/156 |
| 2003/0214183 A1 * | 11/2003 | Breitenbacher et al. | 303/162 |
| 2005/0151416 A1 * | 7/2005 | Feigel | 303/11 |
| 2007/0069577 A1 * | 3/2007 | Nakaura et al. | 303/155 |
| 2007/0112537 A1 * | 5/2007 | Gronau et al. | 702/105 |
| 2007/0158607 A1 * | 7/2007 | Fey et al. | 251/129.16 |
| 2009/0037065 A1 * | 2/2009 | Burkhard et al. | 701/71 |
| 2011/0160972 A1 * | 6/2011 | Crombez et al. | 701/70 |

FOREIGN PATENT DOCUMENTS

| | | |
|---|---|---|
| EP | 0 876 270 | 7/1997 |
| WO | WO 2004/101339 A1 | 11/2004 |
| WO | WO 2004101339 A1 * | 11/2004 |
| WO | WO 2006/042859 A1 | 4/2006 |

* cited by examiner

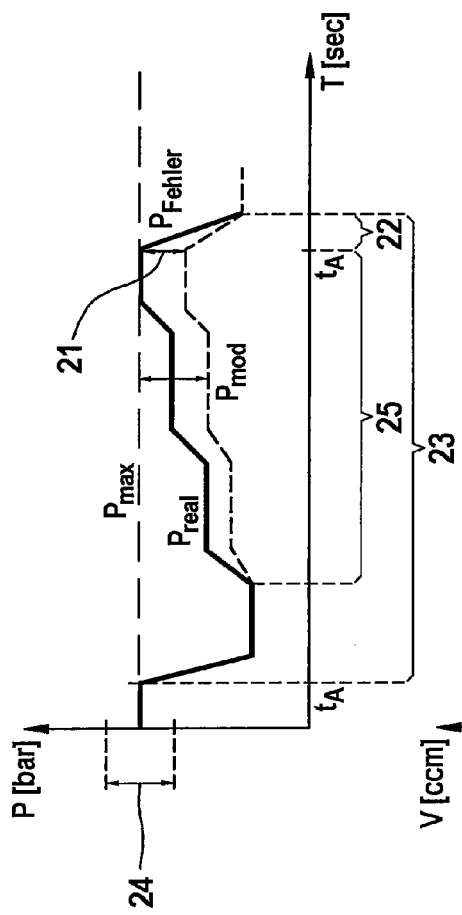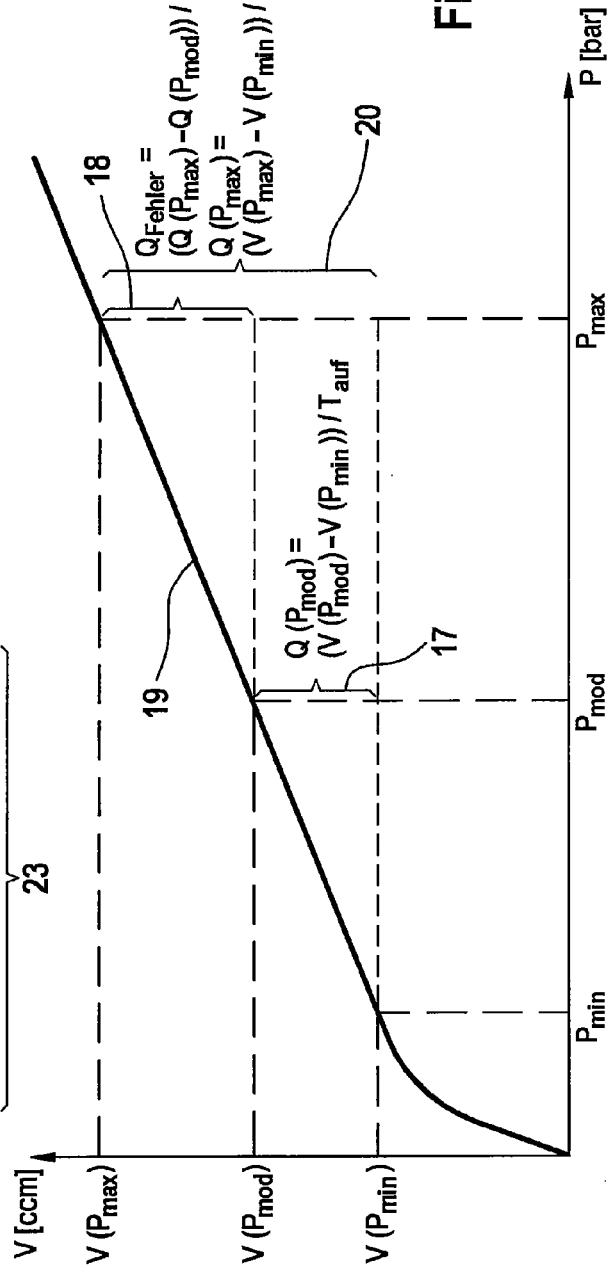

CORRECTION METHOD FOR THE CORRECTION OF CHARACTERISTIC CURVES FOR ANALOGIZED HYDRAULIC VALVES IN MOTOR VEHICLE BRAKING SYSTEMS

CROSS REFERENCE TO RELATED APPLICATIONS

This application is the U.S. national phase application of PCT International Application No. PCT/EP2008/054852, filed Apr. 22, 2008, which claims priority to German Patent Application No. 10 2007 019 929.7, filed Apr. 27, 2007, the contents of such applications being incorporated by reference herein.

BACKGROUND OF THE INVENTION

1. Field of Invention

The invention relates to a correction method a, in which actuation characteristic curves and/or correction values are generated and are used during a pressure control process, to dimension the actuation current for one or more electrically actuated hydraulic valves which are operated in analogue fashion, in such a way that during the operation of an anti-lock brake system at first at least one or, in each case, one actuation characteristic curve is predefined and then the predefined actuation characteristic curve is corrected, in particular in the course of a learning process, characterized in that during a wheel pressure control process the current pressure model value for the controlled wheel is compared with a model locking-pressure level and/or analyzed.

2. Description of Related Art

In electronically controllable motor vehicle brakes having, inter alia, an anti-lock brake function (ABS), and also, if appropriate, vehicle movement dynamics control functions (ESP) etc., there is a continuously increasing need for improved quality of control, as a result of which, in addition to improved safety, the control comfort can also be improved. However, this requires usually complex and therefore costly hydraulic systems which have to be equipped with additional components (pressure sensors, control valves, switching etc.). It is therefore necessary to operate at least some of the valves in electronic brake systems in an analogue fashion.

EP-A-0 876 270 (P 8598) discloses the basic principle of a control cycle in an anti-lock brake system. According to the method described in said document, the gradient of the brake pressure build-up in the preceding brake pressure build-up phase is taken into account for the control of the brake pressure build-up during a control process in the current brake pressure build-up phase.

For example, WO 2004/101339 discloses that for the operation of the electrically actuated hydraulic valves which are operated in an analogue fashion it is important to set the magnetic field of the valve coil and therefore the tappet position as precisely as possible in order to produce a desired pressure gradient by means of the coil current through a current controller. The tappet position depends here in an extremely sensitive way on, inter alia, the current pressure conditions and valve-specific fabrication tolerances. If no directly measured pressure reference from the wheel brake cylinder is available, the brake system must know precisely the relationship between the opening current, differential pressure and volume flow for a valve which is operated in an analogue fashion. If this relationship is known, the control system can set the desired pressure gradient in a reproducible fashion with a defined coil current. In order to obtain the relationship between the valve current and the tappet position, complex measurements of the individual valve characteristics are generally necessary within the assembled brake system after the manufacture of the valves. However, this requires any manufactured brake control assembly to be connected to a test bench, which would have an undesirably large effect on the fabrication costs.

In order to solve this problem, WO 2004/101339 has proposed that, during the operation of the brake device, that is to say for example while the motor vehicle is travelling, an actuation characteristic curve should first be predefined and then during electronic brake control processes (for example during an ABS or ESP control process) said actuation characteristic curve, which is either stored at the factory or produced once by means of an additional calibration routine when the brake control device is activated, is corrected. For this "dynamic" correction, a learning process is carried out during which correction values are produced and used to correct the predefined actuation characteristic curve. During a pressure build-up phase, a current which corresponds to a certain volume flow is applied to the valve by the controller. This volume flow is determined by the controller as a function of the wheel pressure and the pressure/volume characteristic curve in such a way that the valve is operated at a stable point in the operating current characteristic diagram.

It has become apparent that the previously described correction method during operation does not always produce a valve characteristic curve with which volume flow can be set in an optimum way in terms of a high level of comfort and control quality.

SUMMARY OF THE INVENTION

An object of the invention is therefore to improve even further the comfort and the control accuracy when operating with an additional control function in an electronic brake pressure control device which has an anti-lock feature and at least one control valve which is operated in an analogue fashion.

The invention relates to the idea that the locking-pressure level (referred to below as model locking-pressure level) which can, for example, be obtained by means of the pressure/deceleration characteristic curve, that is to say is estimated, can be used to correct the actuation characteristic curve.

A wheel pressure controller with an anti-lock brake function which does not have any pressure sensors in the wheel brake circuits generally uses a (wheel) model pressure which can be calculated in a way known per se and which represents the estimated wheel pressure. Said wheel pressure can be estimated, for example from the admission pressure which can generally be measured with a pressure sensor in the region of the master cylinder, and from the valve-opening and/or valve-closing times.

According to aspects of the invention, during the brake pressure control process, in particular after a pressure build-up phase, the current pressure model value, formed from the wheel pressure model, is compared with a model locking-pressure level and/or analyzed. This step is preferably carried out between a pressure build-up phase after a pressure-reduction phase and particularly preferably before the next pressure-reduction phase.

In order to correct the predefined actuation characteristic curve, a new actuation characteristic curve is preferably obtained or correction values are obtained for correcting the existing actuation characteristic curve. The correction is particularly preferably carried out in accordance with a learning method (recursive correction during an infinite program loop of the controller).

The method preferably differentiates at least one case, and in particular all of the following alternative cases a) to c):

a) The pressure value from the wheel pressure model does not reach the anticipated locking-pressure level. In this case, the real volume flow through the controlled valve was greater than the volume flow calculated with the wheel model pressure. The valve was therefore operated in an excessively high through-flow range. The actuation characteristic curve must be correspondingly adapted in the direction of relatively low through-flow values, which is particularly preferred in this alternative.

b) The pressure value from the wheel pressure model exceeds the anticipated locking-pressure level. In this case, the real volume flow through the valve was lower than the volume flow modeled in the wheel model pressure. The analogue valve is operated in an excessively low through-flow range. The actuation characteristic curve must be correspondingly adapted in the direction of relatively high through-flow values, which is particularly preferred in this alternative.

c) The pressure from the wheel pressure model reaches the anticipated locking-pressure level within predefined limits. The real volume flow through the valve corresponded, or corresponded substantially, to that modeled in the wheel pressure model. The valve is operated in the optimum through-flow range. The actuation characteristic curve does not have to be adapted, which is particularly preferred in this alternative.

The method according to aspects of the invention has the advantage over the method according to the prior art described further above that the actuation of the valves is monitored and its plausibility checked directly. Furthermore, the method operates completely independently of the desired control frequency.

BRIEF DESCRIPTION OF THE DRAWINGS

Further preferred embodiments can be found in the following description of an exemplary embodiment with reference to the figures, in which:

FIG. 2 shows diagram illustrations which explain in more detail the pressure profile and the volume flow calculation in the context of the invention.

DETAILED DESCRIPTION OF THE PREFERRED EMBODIMENTS

Figure 1:
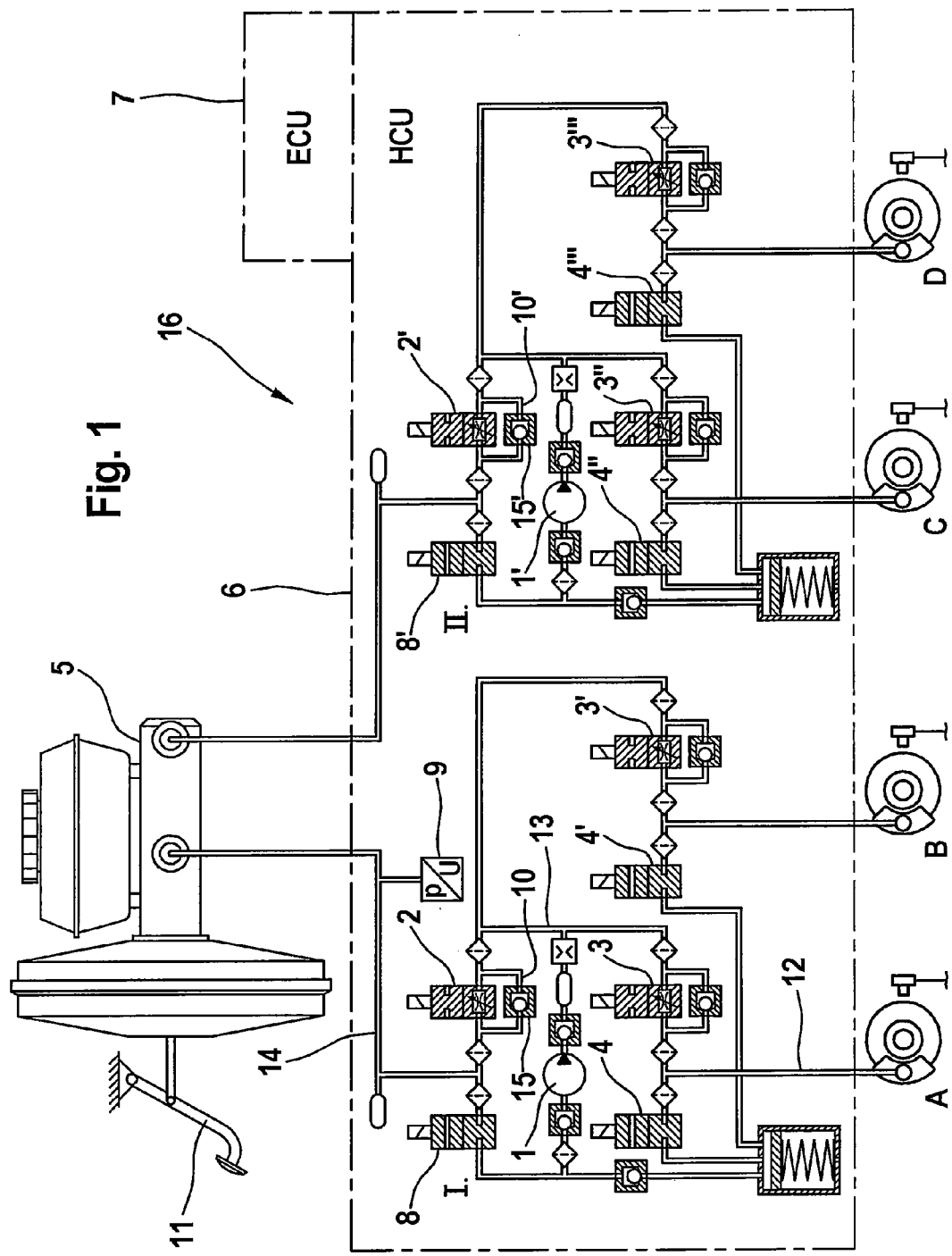
FIG. 1 shows a basic illustration of the pressure control device for motor vehicle brakes with analogue inlet valve control.

FIG. 1 serves firstly to explain the design of the electronic brake system including the hydraulic components, with which brake system analogue actuation and brake control can be carried out. In FIG. 1, a tandem master cylinder 5 is connected to a hydraulic unit 6 (HCU) of an electronic motor vehicle brake system. The electronic unit 7 (ECU) comprises a microprocessor/controller system with which the actuators and sensors which are contained in the valve block can be controlled or apportioned electronically. The hydraulic unit 6 comprises two brake circuits I and II. In addition, each of the brake circuits comprises two wheel pressure circuits (A, B and C, D, respectively), each with an inlet valve 3 or 3', respectively, and an outlet valve 4 or 4', respectively. The electronic system of the ECU 7 comprise a multi-channel current controller which permits independent control of the currents through the coils of the isolating valves 2, 2' which open in the currentless state and the inlet valves 3, 3' which are open in the currentless state. Reference numbers 8 and 8' denote electronic switching valves which are closed in the currentless state. In the hydraulic line 8 which leads to the master cylinder 5 there is an input pressure sensor 9. The illustrated brake system comprises no further pressure sensors in the wheel pressure circuits themselves. However, in principle, additional wheel pressure sensors could also be arranged there, but this is frequently not the case for reasons of cost. Pump 1 or 1' can be used for automatic pressure build-up during a longitudinal (ACC) control process and in vehicle movement dynamics control processes (ESP), and also during traction control processes and the customary feedback of pressure medium in pressure-reduction processes.

The method according to aspects of the invention will now be explained in more detail with reference to FIG. 2. $P_{max}$ denotes the model locking-pressure level (referred to below for short as locking-pressure level) which is formed in a manner known per se from the pressure/deceleration characteristic curve. $P_{mod}$ is the current wheel pressure which results from the wheel pressure model. The diagram in FIG. 2a illustrates the profiles of the model pressures $P_{max}$ and $P_{mod}$ during an ABS pressure control cycle 23. For the correction of the analogue actuation of the inlet valve 3 (FIG. 1), at the start of the pressure-reduction phase $t_A$ 21 (25 denotes the pressure build-up phase in which the analogue valve performs control) which follows a pressure build-up phase, the current wheel pressure model value $P_{mod}$ is compared with the locking-pressure level $P_{max}$ obtained from the pressure/deceleration characteristic curve and analyzed. For this purpose, at the time $t_A$, the difference $P_{error}$ between $P_{max}$ and $P_{mod}$ is firstly formed:

$$P_{error} = P_{max} - P_{mod} \qquad \text{(FIG.2a, reference number 21)}$$

It can then preferably be tested whether the value of $P_{max}$ is in a band 24 of ±X percent (for example 30 percent) between the last reduction phase and the current reduction phase. If this is not the case, the actuation characteristic curve of the analogue valve is not corrected. This makes it possible to prevent changes in locking pressure, which are caused for example by jumps in the coefficient of friction, incorrectly bringing about correction in the valve actuation process.

In order to compensate for fluctuations of the wheel brake, it is also preferably possible to check whether the absolute value of the difference $P_{error}$ above is greater than a value which is proportional to the locking-pressure level (also 30 percent in the example):

$$|P_{error}| > Y \cdot P_{max} \text{ (e.g. where Y=0.3)}$$

If this is not the case, the characteristic curve is not corrected. This is intended to take into account fluctuations in the pressure level which are caused by fluctuations in the coefficient of friction of the wheel brake.

In the next step, the mean volume flow $Q(P_{max})$ is calculated from the wheel volumes V on the basis of the volume at the locking-pressure level $V(P_{max})$ and the pressure build-up time $T_{up}$. In an analogous fashion, the volume flow $Q(P_{mod})$ is calculated on the basis of the volume at the wheel pressure level $V(P_{mod})$. In each case a pressure/volume characteristic curve 19 (FIG. 2b) is used as the basis for this and it is permanently stored in the electronic system. In the next equations, $P_{min}$ is the minimum value of the pressure resulting from the wheel pressure model after the pressure reduction of the previous control cycle. $T_{up}$ denotes the duration of the current pressure build-up 25 (see FIG. 2a).

$$Q(P_{max})=(V(P_{max})-V(P_{min}))/T_{up} \quad \text{(FIG. 2b, reference number 20)}$$

$$Q(P_{mod})=(V(P_{mod})-V(P_{min}))/T_{up} \quad \text{(FIG. 2b, reference number 17)}$$

Finally, the above variables of the volume flow error $Q_{error}$ are calculated in the valve actuation process:

$$Q_{error}=(Q(P_{max})-Q(P_{mod}))/Q(P_{mod}) \quad \text{(FIG. 2b, reference number 18)}$$

In the text which follows, the current pressure build-up cycle will be denoted by the value n. The pressure build-up cycle following said cycle is indexed with the value n+1. In the cycle n+1, the volume flow $Q_{req}$ which is set at the valve is then corrected with the value of the calculated volume flow error $Q_{error}$ in accordance with the following formula, in which the absolute value of this variable $|Q_{error}|$ is limited in particular to a maximum value $|Q_{error}|<Q_{error\text{-}max}$.

$$Q_{req,n+1}=Q_{req,n}\cdot(1+Q_{error})$$

It can also be advantageous for the correction method according to aspects of the invention not to be carried out until a specific number of control cycles have already been carried out during a brake control process. The control system is then in a steady state and more accurate correction values are therefore obtained.

According to a further preferred embodiment of the invention it is possible to determine $Q_{error}$ over a larger number of cycles or over one complete ABS control process and to determine a mean value from the individual cycles or over the entire ABS control process. It would also be appropriate, in particular, to store the correction values $Q_{error}$ over the ignition run or to overwrite the characteristic curve stored in the brake controller.

The invention claimed is:

1. A correction method comprising the steps of:
   generating, by a processor, at least one of actuation characteristic curves and correction values;
   using, by the processor, the at least one of actuation characteristic curves and correction values during a pressure control process to dimension an actuation current for one or more electrically actuated hydraulic valves which are operated in analogue fashion,
   predefining, by the processor, one actuation characteristic curve during operation of an anti-lock brake system;
   correcting, by the processor, the predefined actuation characteristic curve in the course of a learning process, and
   computing, by the processor, a difference pressure between a current pressure model value for the controlled wheel and a model locking-pressure level during a wheel pressure control process,
   wherein at least one of the difference pressure and the model locking-pressure level are compared to a respective threshold, and if the at least one of the difference pressure and the model locking-pressure level exceed the respective threshold, the predefined actuation characteristic curve is not corrected.

2. The method as claimed in claim 1 further comprising the step of determining the model locking-pressure level from a pressure/deceleration characteristic curve.

3. The method as claimed in claim 1 further comprising the step of checking whether the pressure model value reaches the model locking pressure value or reaches the model locking pressure level at least within a permissible tolerance.

4. The method as claimed in claim 1 further comprising the step of checking whether the pressure model value exceeds the model locking pressure level or exceeds said model locking pressure level by a predefined minimum value.

5. The method as claimed in claim 1 further comprising the step of checking whether the pressure model value does not reach the model locking pressure level or does not reach the model locking-pressure level at least within a permissible tolerance.

6. A correction method comprising the steps of:
   generating, by a processor, at least one of actuation characteristic curves and correction values;
   using, by the processor, the at least one of actuation characteristic curves and correction values during a pressure control process to dimension an actuation current for one or more electrically actuated hydraulic valves which are operated in analogue fashion,
   predefining, by the processor, one actuation characteristic curve during operation of an anti-lock brake system;
   correcting, by the processor, the predefined actuation characteristic curve in the course of a learning process;
   computing, by the processor, a difference pressure between a current pressure model value for the controlled wheel and a model locking-pressure level during a wheel pressure control process,
   wherein at least one of the difference pressure and the model locking-pressure level are compared to a respective threshold, and if the at least one of the difference pressure and the model locking-pressure level exceed the respective threshold, the predefined actuation characteristic curve is not corrected; and
   determining, by the processor, a pressure medium volume flow Q(P) during a control cycle with the pressure model value and the model locking pressure level using a pressure medium/volume characteristic curve V(P).

7. The method as claimed in claim 6 further comprising the step of determining a level of a correction to be carried out by comparing a pressure medium volume flow $Q(P_{mod})$ as a function of a pressure from a wheel pressure model and a pressure medium volume flow $Q(P_{max})$ as a function of the model locking-pressure level.

8. The method as claimed in claim 1 further comprising the step of carrying out a learning process which extends over a plurality of cycles of the anti-lock brake system with the number n, and in each cycle, or in each suitable cycle, a correction of the predefined characteristic curve is carried out in accordance with a recursive formula by way of parameters obtained from a current cycle.

9. The method as claimed in claim 1 further comprising the step of carrying out the analyzing/comparing step after a pressure build-up phase.

10. The use of the method according to claim 1 in motor vehicle brake systems.

11. A brake pressure control device having at least anti-lock brake system, wherein during a control process a controller adjusts brake pressures in a plurality of wheel brake actuators by opening and closing inlet valves, outlet valves, or both inlet valves and outlet valves,
   wherein the inlet valves can be driven in an analogue fashion by an electric current controller,
   wherein the controller carries out a correction method during an anti-lock brake control process, wherein during the correction method the controller is configured to:
   (i) generate at least one of actuation characteristic curves and correction values, (ii) use the at least one of actuation characteristic curves and correction values during a pressure control process to dimension an actuation current for one or more electrically actuated hydraulic valves which are operated in analogue fashion, (iii) predefine one actuation characteristic curve during operation of an anti-lock brake system,
(iv) correct the predefined actuation characteristic curve in the course of a learning process, and
(v) compute a difference pressure between a current pressure model value for the controlled wheel with a model locking-pressure level during a wheel pressure control process, wherein at least one of the difference pressure and the model locking-pressure level are compared to a respective threshold, and if the at least one of the difference pressure and the model locking-pressure level exceed the respective threshold, the predefined actuation characteristic curve is not corrected.

* * * * *